US010496057B2

(12) United States Patent
Hrejsa

(10) Patent No.: US 10,496,057 B2
(45) Date of Patent: Dec. 3, 2019

(54) HVAC SYSTEM, A METHOD FOR OPERATING THE HVAC SYSTEM AND A HVAC CONTROLLER CONFIGURED FOR THE SAME

(71) Applicant: Lennox Industries Inc., Richardson, TX (US)

(72) Inventor: Peter Hrejsa, Frisco, TX (US)

(73) Assignee: Lennox Industries Inc., Richardson, TX (US)

( * ) Notice: Subject to any disclaimer, the term of this patent is extended or adjusted under 35 U.S.C. 154(b) by 203 days.

(21) Appl. No.: 14/991,180

(22) Filed: Jan. 8, 2016

(65) Prior Publication Data

US 2016/0209064 A1 Jul. 21, 2016

Related U.S. Application Data

(60) Provisional application No. 62/104,981, filed on Jan. 19, 2015.

(51) Int. Cl.
*G05B 15/02* (2006.01)
*G05D 23/19* (2006.01)
(Continued)

(52) U.S. Cl.
CPC .............. *G05B 15/02* (2013.01); *F24F 11/30* (2018.01); *F24F 11/62* (2018.01); *G05D 23/1904* (2013.01); *F24F 11/65* (2018.01); *F24F 2110/10* (2018.01); *F24F 2110/12* (2018.01); *F24F 2120/10* (2018.01); *F24F 2130/00* (2018.01); *F24F 2130/10* (2018.01)

(58) Field of Classification Search
CPC .. F24F 11/006; F24F 11/0012; F24F 11/0034; F24F 11/08; F24F 1/007; G05B 15/02; G05D 23/19; B32B 9/00; B32B 37/12; B32B 35/53
See application file for complete search history.

(56) References Cited

U.S. PATENT DOCUMENTS 4,656,835 A 4/1987 Kidder et al.
5,270,916 A * 12/1993 Sexton ...................... G05B 5/01
700/41

(Continued)

OTHER PUBLICATIONS

Sena Temel et al., "EE402—Discrete Time Control Systems Recitation 4 Report", Apr. 2, 2013, Middle East Technical University, pp. 1-3, 7.*

(Continued)

*Primary Examiner* — Robert E Fennema
*Assistant Examiner* — Santosh R Poudel
(74) *Attorney, Agent, or Firm* — Baker Botts L.L.P.

(57) ABSTRACT

In some embodiments, a controller for a heating, ventilating and air conditioning (HVAC) system comprises an interface and a processor. The interface receives a comfort temperature set point and a sensed temperature for the enclosed space. The comfort temperature set point comprises a single set point used for both heating and cooling mode operation of the HVAC system. The processor determines a total error value based on comparing the sensed temperature and comfort temperature set point, selects a mode of operation based on the total error value, and operates the HVAC system in the selected mode of operation.

17 Claims, 6 Drawing Sheets

(51) Int. Cl.
  *F24F 11/30* (2018.01)
  *F24F 11/62* (2018.01)
  *F24F 110/10* (2018.01)
  *F24F 110/12* (2018.01)
  *F24F 120/10* (2018.01)
  *F24F 130/00* (2018.01)
  *F24F 130/10* (2018.01)
  *F24F 11/65* (2018.01)

(56) References Cited

U.S. PATENT DOCUMENTS

| | | | | |
|---|---|---|---|---|
| 5,298,845 | A * | 3/1994 | DeBoer | G05B 11/42 318/609 |
| 5,718,372 | A * | 2/1998 | Tishler | F24D 19/1084 236/11 |
| 5,799,869 | A * | 9/1998 | Pichotta | B60H 1/00828 165/269 |
| 6,095,427 | A * | 8/2000 | Hoium | B60H 1/3232 236/49.3 |
| 6,101,824 | A * | 8/2000 | Meyer | G05B 11/42 62/175 |
| 6,296,193 | B1 * | 10/2001 | West | F24F 3/044 236/13 |
| 6,729,390 | B1 * | 5/2004 | Toth | F24D 12/02 165/240 |
| 6,751,510 | B1 * | 6/2004 | Tan | G05B 11/42 318/609 |
| 8,950,687 | B2 | 2/2015 | Bergman et al. | |
| 9,157,646 | B2 | 10/2015 | Anderson et al. | |
| 2002/0166659 | A1 * | 11/2002 | Wagner | B32B 9/00 165/185 |
| 2004/0112973 | A1 * | 6/2004 | Tanaka | G05D 22/02 236/44 C |
| 2009/0032235 | A1 * | 2/2009 | Sullivan | F24F 1/0007 165/247 |
| 2009/0140060 | A1 * | 6/2009 | Stoner | G05D 23/1934 236/51 |
| 2010/0174471 | A1 * | 7/2010 | Nakayama | F02D 41/1401 701/108 |
| 2011/0113560 | A1 * | 5/2011 | Receveur | A61G 7/05769 5/706 |
| 2012/0067561 | A1 * | 3/2012 | Bergman | B60H 1/00657 165/257 |
| 2012/0078423 | A1 * | 3/2012 | Zhou | G05D 23/1902 700/278 |
| 2012/0079840 | A1 * | 4/2012 | Lukasse | F25D 17/042 62/115 |
| 2012/0085831 | A1 * | 4/2012 | Kopp | F24F 11/0009 236/46 A |
| 2015/0192914 | A1 * | 7/2015 | Slupik | G05B 15/02 700/275 |
| 2015/0309482 | A1 * | 10/2015 | Iwami | G05D 23/1919 700/37 |

OTHER PUBLICATIONS

"Integral Action and PI Control", Apr. 7, 2015, Control Guru, pp. 2-8 (Year: 2015).*

* cited by examiner

HVAC SYSTEM, A METHOD FOR OPERATING THE HVAC SYSTEM AND A HVAC CONTROLLER CONFIGURED FOR THE SAME

RELATED APPLICATIONS

This application claims the benefit of priority of U.S. Provisional Patent Application No. 62/104,981 filed on Jan. 19, 2015.

TECHNICAL FIELD

This application is directed, in general, to heating, ventilating and air conditioning (HVAC) systems and, more specifically, to manage the heating and cooling modes of an HVAC.

BACKGROUND

HVAC systems can be used to regulate the environment within an enclosed space. Typically, an air blower is used to pull air from the enclosed space into the HVAC system through ducts and push the air back into the enclosed space through additional ducts after conditioning the air (e.g., heating, cooling or dehumidifying the air). Various types of HVAC systems, such as residential and commercial, may be used to provide conditioned air for enclosed spaces.

Each HVAC system typically includes a HVAC controller that directs the operation of the HVAC system. The HVAC controller can direct the operation of a conditioning unit, such as an air conditioner or a heater, to control the temperature of the enclosed space.

SUMMARY

In some embodiments, a controller for a heating, ventilating and air conditioning (HVAC) system comprises an interface and a processor. The interface receives a comfort temperature set point and a sensed temperature for the enclosed space. The comfort temperature set point comprises a single set point used for both heating and cooling mode operation of the HVAC system. The processor determines a total error value based on comparing the sensed temperature and comfort temperature set point, selects a mode of operation based on the total error value, and operates the HVAC system in the selected mode of operation.

Certain embodiments may provide one or more technical advantages. For example, certain embodiments provide an operation scheme for an HVAC system that maintains a single desired comfort temperature within an enclosed space. In one embodiment, an HVAC system employs a dynamic operating band which allows for a delay in initiating an opposite conditioning mode when the opposite conditioning mode is minimally required. As such, an HVAC controller reduces oscillations between conditioning modes during light load conditions where overshoot of the desired comfort temperature is likely. In another embodiment, the HVAC system employs a coasting mode as a mode of operation. Such a mode allows the HVAC system to coast to, rather than drive to, a new comfort temperature without operating the conditioning equipment. Some embodiments may benefit from some, non, or all of these advantages. Other technical advantages may be readily ascertained by one of ordinary skill in the art.

BRIEF DESCRIPTION

Reference is now made to the following descriptions taken in conjunction with the accompanying drawings, in which.

DETAILED DESCRIPTION

Figure 1:
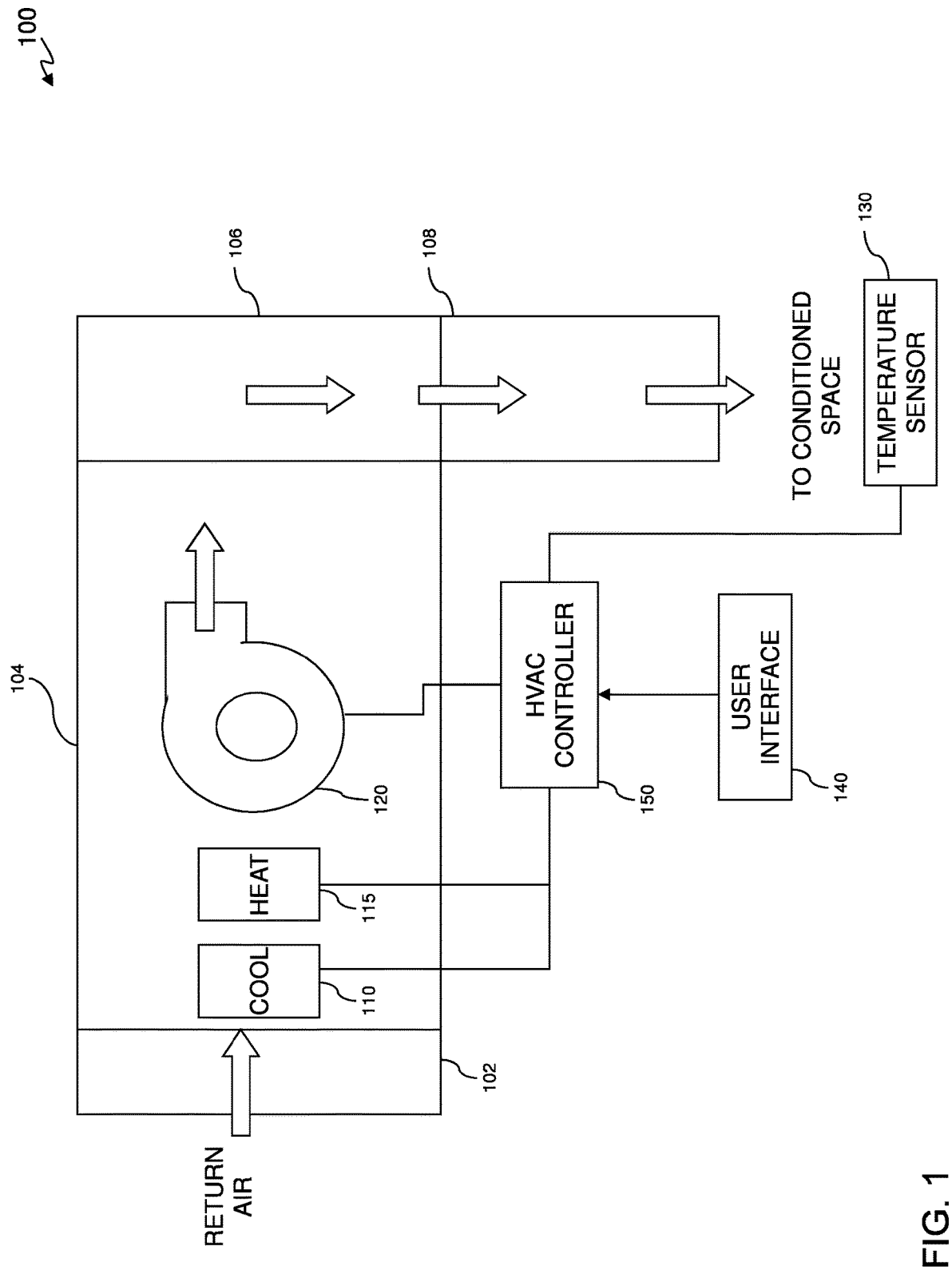
FIG. 1 is a block diagram of an embodiment of a HVAC system constructed according to the principles of the disclosure.

A heating set point and a cooling set point are typically established by a user for the heating and cooling operating modes of an HVAC system. With the two set points and operating modes, a user is required to manually switch between the heating and cooling operating modes. This can be frustrating and confusing; especially in climates where the outdoor temperature changes rapidly.

It is realized herein that it would be advantageous for a user to be able to select, independent of a conditioning mode, a single desired temperature for his or her comfort. As such, a user would not have to worry about switching back and forth between the different operating modes or remembering the different set points for the different operating modes in order to maintain a desired temperature in an enclosed space. Accordingly, an HVAC system is disclosed that allows a user to select a single comfort temperature for an enclosed space. Thus, instead of selecting set points for the different conditioning modes, a user can simply choose a comfort temperature for the HVAC system to maintain in the enclosed space. The disclosed HVAC system can then determine if and when, for example, a heating source or a cooling source needs to be activated to condition air for the enclosed space to maintain the comfort temperature. The comfort temperature is maintained within a dynamic operating band.

The dynamic operating band can be based on a total error value that represents the difference between the comfort temperature and a sensed temperature within the enclosed space. An HVAC system that employs the disclosed dynamic operating band versus, for example, a fixed operating band, can advantageously reduce oscillations between heating and cooling modes during light load conditions where overshoot of a comfort temperature is expected. Additionally, a dynamic operating band can allow a longer wait time before initiating an opposite conditioning mode when the opposite conditioning mode is minimally required. In one embodiment, the total error value is a modified Proportional Integral (PI) error. A PI error or total PI error is calculated according to a normal temperature algorithm employed in HVAC systems. For example, a PI error includes a proportional error and an integral error. The proportional error is determined by multiplying a temperature error by the proportional gain and the integral error is calculated by adding the previous integral error to the product of the integral gain, the temperature error, and the sampling time interval in minutes. One skilled in the art will understand the proportional gain and integral gain used with HVAC controls.

Unlike conventional HVAC systems, however, the disclosure provides an HVAC system that controls the integral portion of the PI error, the integral error, to direct the operation thereof. For example, the HVAC system can prevent the integral error from changing signs until certain criteria, or change criteria, are met. Thus, in one embodiment the disclosed HVAC system calculates and modifies the integral error to prevent it from increasing or decreasing to change signs (i.e., cross zero), which would indicate conditioning in an opposite mode, until the change criteria is satisfied. When the change criteria conditions are met, in some embodiments the integral error can be set to zero or held at zero to prevent opposite modes of conditioning from cyclically turning on and off.

In one embodiment, the change criteria is based on the value of a change counter that is incremented or decremented according to a slope of the sensed temperature over time. In one embodiment, the five minute slope of the sensed temperature over time is compared to a slope threshold value to determine if the counter is incremented or decremented. In one embodiment, a first slope threshold is used to determine if the change counter is incremented and a different, second slope threshold is used to determine if the change counter is decremented. In some embodiments, the change counter is incremented and decremented asymmetrically. While the change counter remains below a change threshold, the integral error is prevented from growing toward the opposite mode. Once the change counter crosses the change threshold, then the integral error is allowed to grow and the value of the change counter is not monitored. The slope threshold and change threshold can be predetermined values based on historical data or experimentation. In some embodiments, the slope threshold and change threshold can vary based on the type or model of HVAC system.

In some embodiments, an analysis of the change criteria is triggered or initiated based on an analysis barrier. The analysis barrier is a set of established requirements that are monitored or checked to determine when the change criteria should even be analyzed. In one embodiment, the analysis barrier is based on a sign of the integral error and a value of the temperature error. The temperature error is the difference between the comfort temperature and the actual or sensed temperature of the enclosed space (e,g.,comfort temperature—sesnsed temperature). If the integral error is greater than zero and a temperature error is less than or equal to a designated mode change temperature, then the slope of the sensed temperature over time is checked. The mode change temperature is a parameter that is set to a designated temperature value. The mode change temperature can be a temperature value that is determined from historical data or experimentation.

Accordingly, the disclosure provides a scheme to reduce transitions between opposite conditioning modes, when operating using the comfort temperature, based on a comparison of the total error value to a predetermined threshold wherein the integral error is controlled according to a change criteria. The disclosed HVAC system therefore prevents or at least reduces changing from one conditioning mode to an opposite conditioning mode when unnecessary.

In some embodiments, the HVAC system can be programmed to operate according to different parameters during different periods. For example, an HVAC system can be programmed to operate according to a first set of parameters during the weekdays and according to a second set of parameters during the weekend. For programmable HVAC systems, a user can select a different comfort temperature for each programmable scheduled period.

It is also realized herein that an enclosed space is not always occupied. As such, the HVAC system does not need to waste energy maintaining the enclosed space at the comfort temperature when no one is there. Accordingly, an HVAC system is disclosed herein that also considers an occupancy state when operating using a comfort temperature. An occupancy state is a condition of the HVAC system that indicates whether the enclosed space is occupied. For example, if a user is within the enclosed space, the occupancy state is occupied. In some embodiments, the occupancy state is occupied when a user is proximate the enclosed space. If a user is not within the enclosed space or is not proximate the enclosed space, the occupancy state is unoccupied, i.e., an unoccupied state. The occupancy state can be determined manually and/or automatically. For example, the occupancy state can be determined by activating an "away" button on a user interface of the HVAC system. The occupancy state can also be determined automatically by geofencing, infrared detection, schedule program, learned behavior, etc.

When in an occupied state, the HVAC system can operate based on the comfort temperature. Thus, in some embodiments, a user selects a comfort temperature for each programmable period; this will then be used for all conditioning modes of the respective programmable periods unless the HVAC system is marked as unoccupied during a programmable period. When a programmable period is marked as unoccupied, then the HVAC system can operate according to heating and cooling set points as employed in conventional systems. Accordingly, in an unoccupied state, the sensed temperature of the enclosed space can be maintained between independent maximum and minimum unoccupied temperatures. The maximum unoccupied temperature is used for cooling and the lower minimum unoccupied temperature is used for heating.

It is also realized herein that it would be advantageous to maintain the enclosed space at the comfort temperature when in an occupied state without initiating a heating source or a cooling source of the HVAC system when possible. When employing a single comfort temperature to control both the heating and cooling, the disclosure realizes that when a change of the comfort temperature occurs sometimes it is desirable for the HVAC system to coast to the new comfort temperature rather than drive to the new comfort temperature with the conditioning equipment. Accordingly, an HVAC system is disclosed that determines, based at least on the comfort temperature, if the heating source is needed, if the cooling source is needed or if the HVAC system should be allowed to coast without initiating the heating source or cooling source. As such, the HVAC system determines if the comfort temperature can be obtained within a predetermined amount of time without turning on either the heating or cooling source. In some embodiments, coasting may not be enabled when transitioning from unoccupied to occupied state. For example, a user can select to enable or disable coasting.

Typically, each HVAC system will include an HVAC controller that directs the operations thereof. An HVAC controller may be one or more electric circuit boards including at least one micro-processor or micro-controller integrated circuit. The HVAC controller also includes the support circuitry for power, signal conditioning, and associated peripheral devices. In addition to a processor, the HVAC controller may include a memory having a program or series of operating instruction (i.e., firmware or software) that executes in such a way as to implement the features described herein when initiated by the processor. Additionally, the processor is configured to provide control functionality beyond the scope of the present disclosure.

The disclosure further realizes the effect of outdoor weather, such as outdoor temperatures, on conditioning an indoor environment. Accordingly, the disclosure provides embodiments where changing conditioning modes is prevented when employing the comfort temperature depending on the outside weather associated with the enclosed space. For example, the HVAC system or a HVAC controller thereof can be configured to prevent changing to a cooling mode when the outdoor temperature is below a cool temperature threshold, and prevent a mode change to heating when the outdoor temperature is above a heat temperature threshold. The cool and heat temperature thresholds can be predetermined by the manufacturer or set by the installer or user. The temperature thresholds can also be modified after originally being set. In some embodiments, the cool and heat thresholds can be associated with seasons of the year and/or based on an installed location of the HVAC system. A user interface can be used to set or modify the cool and heat thresholds for the HVAC system.

The outdoor temperature can be a sensed temperature measured proximate the enclosed space from an outdoor thermometer connected to or part of the HVAC system. In other embodiments, the outdoor weather including temperature can be received for the installed location of the HVAC system from one or more external data sources that are independent of the HVAC system, including, but not limited to ACCUWEATHER®, INTELLICAST®, THE WEATHER CHANNEL®, the National Oceanic and Atmospheric Administration (NOAA) National Weather Service, and various local weather services proximate the installed location of the HVAC system. As such, the HVAC system can include an HVAC controller configured to communicate via a communications network. The HVAC controller can include a gateway to connect to the communications network. In some embodiments, the communications network can include a local area network (LAN) such as a wireless local area network (WLAN). The WLAN can be a WLAN of the enclosed space, such as is typically employed in houses or businesses.

The disclosure also provides an HVAC system that prevents a change in conditioning modes according to a switching criteria when a comfort temperature change is not received. In one embodiment, the switching criteria is based on an idle time of the HVAC system, the total error value and the signs of the proportional error and the integral error. In some embodiments, the idle time is twenty minutes, the total error value must be greater than an error limit, and the proportional error and the integral error must have the same sign, i.e., both must be either positive values or negative values. In one embodiment, the error limit is the proportional gain times the mode change temperature.

As noted above, in some embodiments the disclosed HVAC system only changes conditioning modes when the total error value reaches a predetermined limit. In some embodiments, the predetermined limit is the proportional gain multiplied by the mode change temperature. Since the integral error can be artificially held to zero as disclosed herein, changes between conditioning modes can only be based on the proportional error. However, the integral error can affect the total error value since there are exit conditions that allow the integral error to start incrementing. This will allow the integral error to contribute to the total error and provide for faster conditioning mode changes.

Step changes in the comfort temperature can also cause the conditioning mode to be changed such that when the system first experiences a step change in the positive direction, and coasting is allowed, then the mode is set to cooling. Likewise, if a step change in the negative direction occurs and coasting is allowed, then the mode is set to heat.

Turning now to FIG. 1, illustrated is a block diagram of an embodiment of a HVAC system 100 constructed according to the principles of the disclosure. The HVAC system 100 includes a return duct 102, a return plenum 104, a supply duct 106 and a supply plenum 108. Additionally, the HVAC system 100 includes conditioning systems for cooling and heating air in the enclosed space. The conditioning systems include a cooling system or cooling source 110 and a heating system or heating source 115. The cooling system 110 can include a refrigeration circuit having a compressor system, evaporator coils and condenser coils fluidly coupled together. The cooling system 110 represents a single cooling stage of the HVAC system 100. Given the teachings herein, one skilled in the art will understand that this disclosure also applies to other HVAC embodiments having more than one cooling stage. The heating system 115 can include a gas furnace, electric heating elements, or even a combination thereof. The heating system 115 can also be multi-staged.

The HVAC system 100 also includes an indoor air blower 120, a temperature sensor 130, a user interface 140 and an HVAC controller 150. Given the teachings herein, one skilled in the art will also understand that the HVAC system 100 may include additional components and devices that are not presently illustrated or discussed but are typically included in an HVAC system, such as, a power supply, an expansion valve, a humidity sensor, etc. Some of illustrated components of the HVAC system 100 may be contained within a single enclosure (e.g., a cabinet). In one embodiment, the HVAC system 100 is a commercial system, such as a rooftop unit. The HVAC system 100 can also be a residential system. In some embodiments, the heating and cooling sources for the HVAC system 100 do not operate until activated for conditioning.

The cooling system 110, the heating system 115 and the indoor air blower 120 may be conventional devices that are typically employed in HVAC systems. At least some of the operation of the HVAC system 100 can be controlled by the HVAC controller 150 based on inputs from various sensors of the HVAC system 100 including the temperature sensor 130 or a humidity sensor. For example, the HVAC controller 150 can cause the indoor air blower 120 to move air across the cooling system 110 and into the enclosed space.

The temperature sensor 130 is configured to sense the temperature within the enclosed space and send the sensed temperature to the HVAC controller 150. The user interface 140 is configured to be an interface between a user and the HVAC system 100. The user interface 140 can be an HVAC device that has a primary function of communicating between the HVAC system 100 and the user. In some, embodiments, the user interface 140 can be a non-HVAC device, such as a smart phone, that includes an application which allows communication between with the HVAC system 100. There may be multiple user interfaces 140 for the HVAC system 100. In some embodiments, the temperature sensor 130 and the user interface 140 can also be conventional devices. In one embodiment, the temperature sensor 130 is a thermostat that also functions as a user interface for the HVAC system 100.

The HVAC controller 150 may include a processor, such as a microprocessor, configured to direct the operation of the HVAC system 100. Additionally, the HVAC controller 150 may include an interface and a memory coupled thereto. The interface may include multiple ports for transmitting and receiving data from at least other components or devices of the HVAC system 100, such as the cooling system 110, the heating system 115 and the blower 120. The memory section may be a conventional memory that is constructed to store data and computer programs, including data and programs to provide functionality as disclosed herein.

As illustrated in FIG. 1, the HVAC controller 150 is coupled to the various components of the HVAC system 100. In some embodiments, the connections therebetween are through a wired-connection. A conventional cable and contacts may be used to couple the HVAC controller 150 to the various components of the HVAC system 100 via the controller interface. In other embodiments, a wireless connection may also be employed to provide at least some of the connections.

In one embodiment, the HVAC controller 150 is configured to operate both the cooling system 110 and the heating system 115 of the HVAC system 100 based on a single comfort temperature for the enclosed space. As such, the HVAC controller 150 is configured to determine if either a heat source or a cooling source for the HVAC system is needed based on the comfort temperature. Additionally, the HVAC controller 150 is configured to determine conditioning requirements based on a total error value.

As noted above, the total error value is used to control the operation of the HVAC system 100 when in an occupied state. When in an unoccupied state, the PI error is used to direct operation of the HVAC system 100 and is determined according to conventional methods. As such, the HVAC controller 150 employs a modified PI error, the total error value, when in an occupied state and employs the PI error when in an unoccupied state. In an occupied state, the HVAC system 100 can operate according to a single comfort temperature. While in the unoccupied state, the HVAC system 100 can operate according to standard heating and cooling set points.

In some embodiments, if the HVAC controller 150 has not determined a conditioning mode for the HVAC system 100, as is the case when the HVAC system 100 powers up for the first time, or is turned on from an off system switch, then the HVAC controller 150 does not modify the integral error. Additionally, if the HVAC system 100 is actively coasting, the integral error value is managed such that integral wind up does not occur. In one embodiment, coasting only occurs in an occupied state.

After manipulations of the integral error have occurred, the HVAC controller 150 calculates the total error value by adding the proportional and integral errors. While running in occupied mode employing the comfort temperature, the HVAC controller 150 is configured in one embodiment to only calculate the total error value to one side of zero; positive side while in heating mode, and negative side while in cooling mode.

While in an occupied state and using one comfort temperature, the HVAC controller 150 employs hysteresis between the heating and cooling modes to prevent the opposing conditioning systems from causing each other to turn on. While the HVAC system 100 is in an occupied state, changes to the comfort temperature and the total error value can cause the conditioning modes to transition. Without a comfort temperature change, the HVAC controller 150 is configured to prevent a conditioning mode from transitioning to the opposite conditioning mode until the total error value is greater than switch threshold towards the conditioning mode opposite the current conditioning mode. In one embodiment, the switch threshold is a value of ten.

When the comfort temperature changes, the HVAC controller 150 can use the coasting status of the HVAC system to transition to the opposing conditioning mode. In one embodiment, when the conditioning mode changes, the HVAC controller 150 delays a change over for a set amount of time (e.g., five minutes) between the time the previous mode conditioning has stopped and the current mode of conditioning can start. If the conditioning mode determined is not the same as the previous conditioning mode, then in some embodiments the HVAC controller 150 must determine the following items again: comfort temperature, step change status, coast status, and total error value. More detail of a controller for a HVAC system is illustrated and discussed with respect to FIG. 2.

Figure 2:
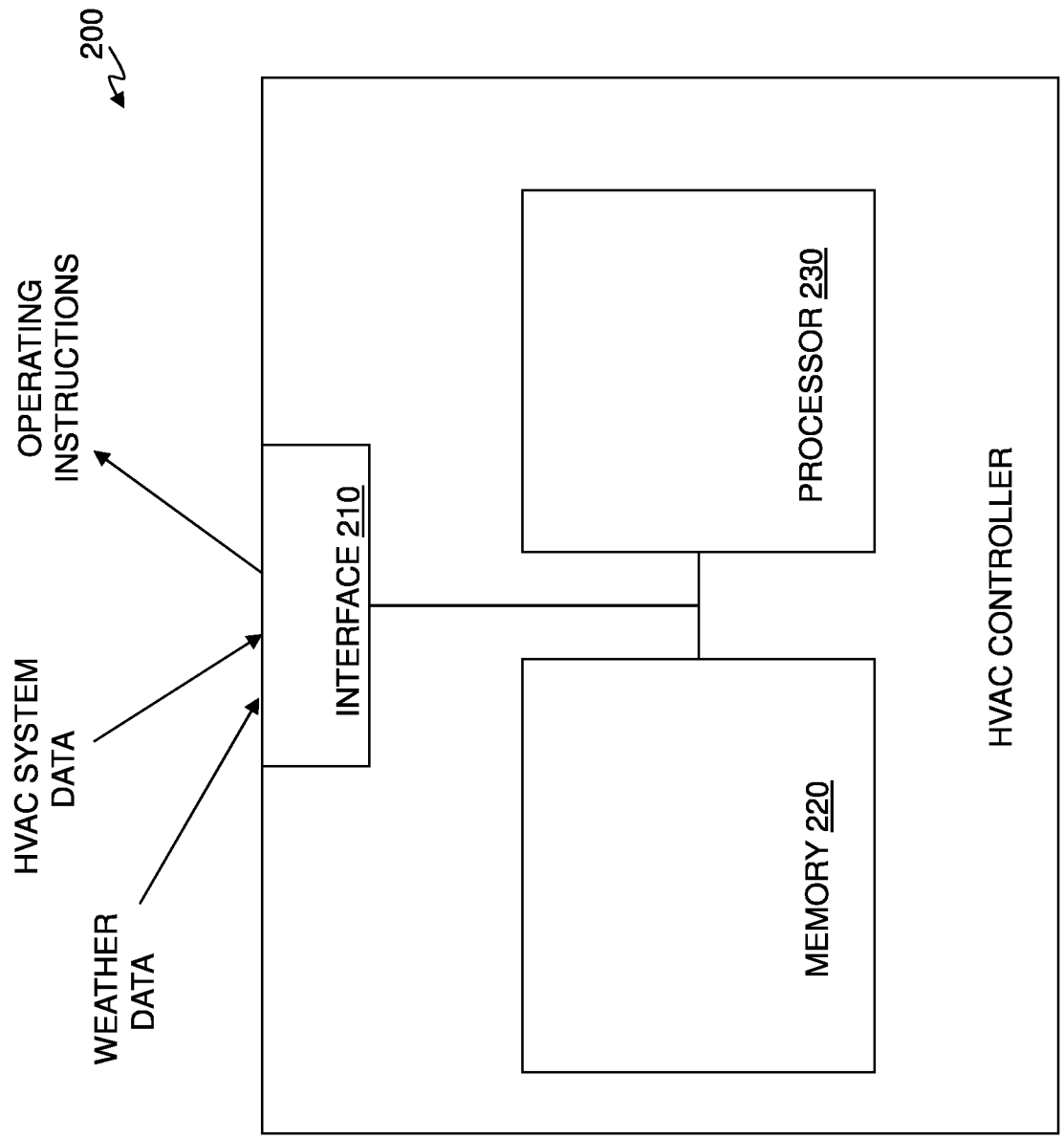
FIG. 2 is a block diagram of an embodiment of a HVAC controller constructed according to the principles of the disclosure.

FIG. 2 is a block diagram of an embodiment of a HVAC controller 200 constructed according to the principles of the disclosure. The HVAC controller includes an interface 210, a memory 220 and a processor 230. The HVAC controller 200 may also include additional components typically included within a controller for a HVAC system, such as a power supply or power port. The HVAC controller 200 is configured to direct the operation of a HVAC system, such as a rooftop HVAC unit or a residential system having indoor and outdoor components.

The interface 210 may be a conventional interface that is used to receive and transmit data for a controller, such as a micro-controller. The interface 210 is configured to receive signals indicating conditions or events associated with the HVAC system. The signals may be associated with a sensed temperature of the enclosed space, temperature inputs, occupancy states, etc.

The interface 210 is configured to receive a comfort temperature for the enclosed space. The interface 210 may be a conventional device for transmitting and receiving data and may include multiple ports for transmitting and receiving data. The ports may be conventional receptacles for communicating data via a communications network or HVAC data bus. The interface 210 is coupled to the memory 220 and the processor 230.

The memory 220 may be a conventional memory typically located within a microcontroller that is constructed to store data and computer programs. The memory 220 may store operating instructions to direct the operation of the processor 230 when initiated thereby. In one embodiment, the memory 220 or at least of portion thereof is a non-volatile memory. The operating instructions may correspond to algorithms that provide the functionality of the operating schemes disclosed herein. For example, the operating instructions may correspond to the algorithm or algorithms that implement the methods illustrated in FIG. 4, FIG. 5 and FIG. 6. The processor 220 may a microprocessor. The interface 210, processor 220 and memory 230 may be coupled together via conventional means to communicate information.

The processor 230 is configured to operate the HVAC system in one of a plurality of conditioning modes based on the comfort temperature and a total error value. In one embodiment, the processor 230 is configured to direct the HVAC system to either enter a coast mode or one of the conditioning modes. The plurality of conditioning modes includes a heating mode and a cooling mode.

In some embodiments, the processor 230 is configured to consider the occupancy state when directing the operation of the HVAC system. In one embodiment, the processor 230 operates the HVAC system in either the coasting mode or one of the plurality of conditioning modes based on the comfort temperature, the total error value and an occupancy state associated with the HVAC system. Additionally, the processor 230 can be further configured to operate the HVAC system based on a maximum unoccupied temperature and a minimum unoccupied temperature when the occupancy state is unoccupied.

FIGS. 3, 4, 5 and 6 are directed to flow diagrams of embodiments of operating methods for an HVAC system. The HVAC system can be the HVAC system 100 of FIG. 1. An HVAC controller such as described with respect to FIG. 1 or FIG. 2 may be used to perform the methods in FIGS. 3, 4, 5 and 6. Each of these methods may represent an algorithm that is stored on a computer readable medium, such as a memory of an HVAC controller (e.g., the memory 220 of FIG. 2) as a series of operating instructions that direct the operation of a processor (e.g., the processor 230 of FIG. 2).

Figure 3:
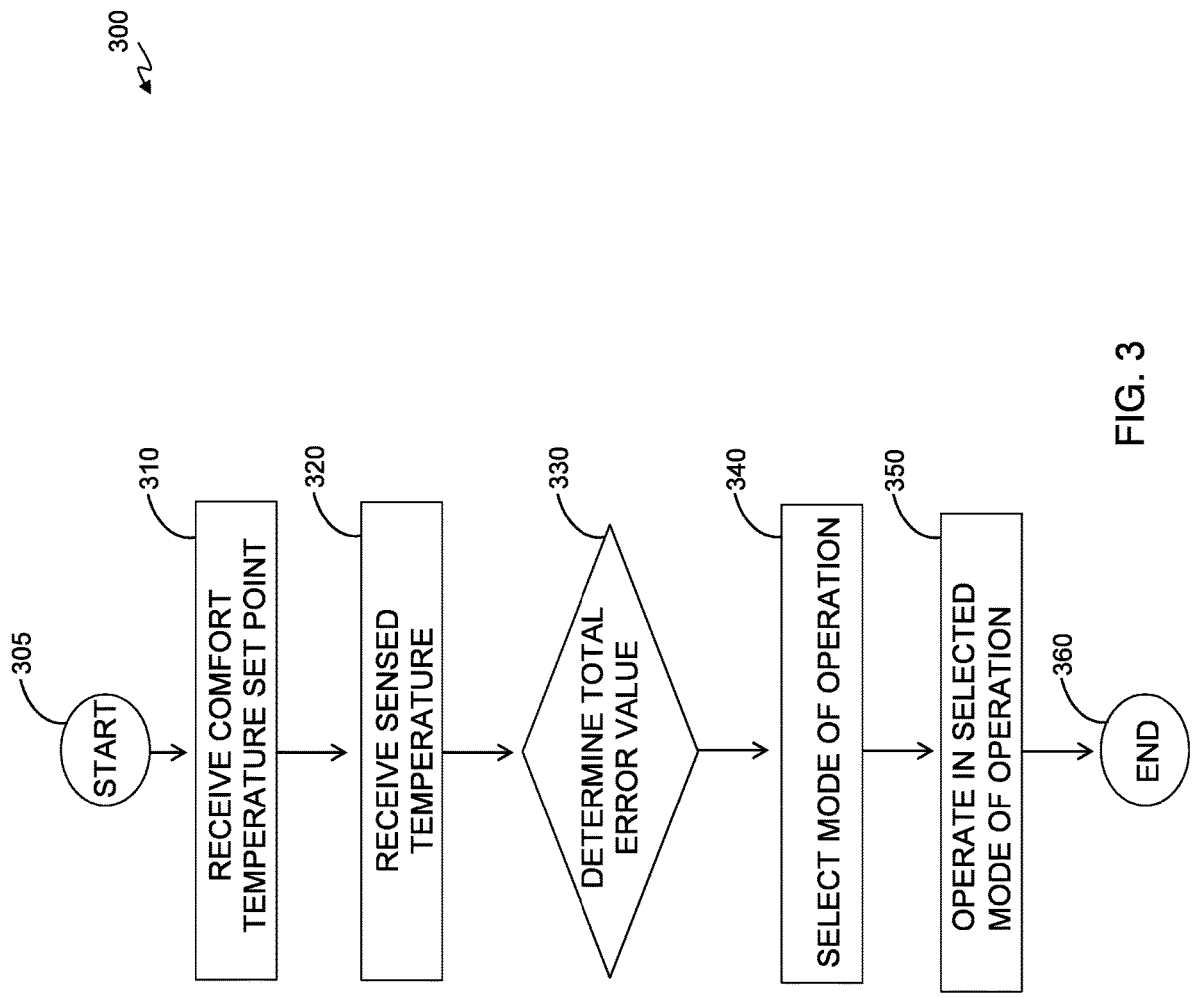
FIG. 3 is a flow diagram of a method of operating an HVAC system carried out according to the principles of the disclosure.

Turning now to these figures, FIG. 3 is a flow diagram of a method 300 of operating an HVAC system that allows a user to select a single comfort temperature for an enclosed space. The method 300 begins in a step 305. At step 310, the HVAC system receives a comfort temperature set point, the comfort temperature set point comprising a single set point used for both heating and cooling mode operation of the HVAC system. The comfort temperature can be received via input from a user employing a user interface of the HVAC system. In some embodiments, a user selects one comfort temperature to be maintained within the enclosed space. In other embodiments, the user can select a comfort temperature according to different parameters or for operation during different programmable periods. As an example, the HVAC system may operate using the comfort temperature when a space is occupied and operate under different parameters when a space is unoccupied.

At step 320, the HVAC system receives the sensed temperature of the enclosed space. This step may be carried out by at least one temperature sensor which is configured to sense the temperature of the enclosed space. In some embodiments, the temperature sensor is a conventional device. In other embodiments, the temperature sensor may be a thermostat.

At step 330, the HVAC system determines a total error value based on comparing the sensed temperature and the comfort temperature set point. In one embodiment, the total error value is a modified Proportional Integral (PI) error which is calculated by determining the sum of the proportional error and the integral error. In such an embodiment, the proportional error is based on the present value of temperature error scaled according to a proportional gain value. The integral error is based on past values of temperature error scaled according to an integral gain value. In some embodiments, the integral error may be modified based on the value of a change counter that is incremented or decremented according to the slope of the sensed temperature of the enclosed space over time. It is realized herein that the change counter may increment or decrement asymmetrically.

In some embodiments, the proportional gain value and integral gain value may be adjusted in response to receiving a change of the comfort temperature set point. As an example, suppose a user changes the comfort temperature set point from 70° F. to 75° F. In response to the change, the proportional gain value and/or integral gain value may be changed to transient state values. The transient state values may be selected to prevent the HVAC system from overcorrecting the temperature, which may otherwise cause frequent or unnecessary cycling between heating mode and cooling mode. The transient state values may further be selected to facilitate reaching the new comfort temperature set point within a pre-determined amount of time. Once the new comfort temperature set point (e.g., 75° F.) has been reached, the proportional gain value and/or integral gain value may be changed to steady state values.

At step 340, the HVAC system selects a mode of operation based on the calculated total error value. The mode selected by the system may be one of a heating mode, a cooling mode or a coasting mode. In some embodiments, the HVAC system may make additional determinations such as whether the HVAC system is currently operating in a conditioning mode. For example, if the HVAC system is currently operating in a cooling mode and the HVAC system determines more cooling is needed to reach the comfort temperature set point, the HVAC system may proceed with handling the cooling demand. However, if the HVAC system is currently operating in a cooling mode and the HVAC system determines that meeting the comfort temperature set point requires initiating heating mode (which is the opposite of the current conditioning mode in this example), the HVAC system may wait to select the heating mode until the total error value exceeds a pre-determined threshold. Additional examples of further determinations that the HVAC system may make, such as whether there has been a change in occupancy, are described below in reference to FIGS. 4-6.

At step 350, the HVAC system operates the selected mode of operation. In some embodiments, operation of the HVAC system includes initiating a conditioning mode, thereby activating a heating or cooling system and an indoor air blower. In other embodiments, operation of the HVAC system includes delaying a change in conditioning modes and allowing the HVAC system to coast towards the received comfort temperature. After operating the selected mode of operation, the method ends in step 360.

Figure 4:
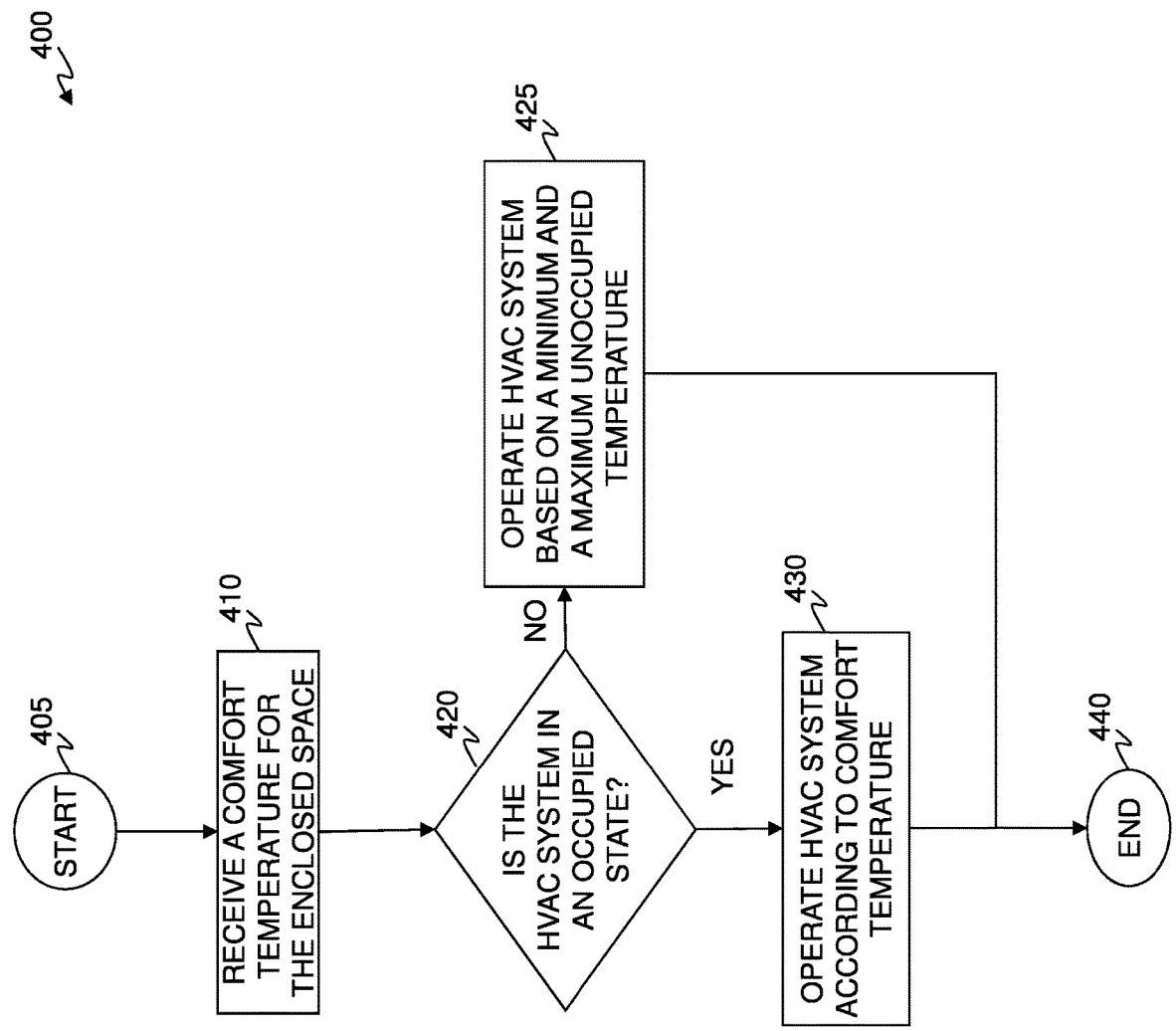
FIG. 4 is a flow diagram of an embodiment of a method of operating an HVAC system carried out according to the principles of the disclosure.

FIG. 4 is a flow diagram of an embodiment of a method 400 of operating an HVAC system carried out according to the principles of the disclosure. The method 400 may be carried out by an HVAC controller such as the HVAC controller 150 or 200. The method begins in a step 405.

In a step 410, an HVAC system receives a comfort temperature for an enclosed space. The comfort temperature can be received via input from a user employing a user interface of the HVAC system.

In a decisional step 420, a determination is made if the HVAC system is in an occupied state. The occupancy state can be determined by an occupancy input.

If the HVAC system is in an occupied state, the conditioning systems of the HVAC system are operated based on the comfort temperature in a step 430. As such, conditioning of the air for the enclosed space is based on a single comfort temperature. The method 400 then ends in a step 440.

Returning to decisional step 420, if the occupancy state is unoccupied, the method 400 continues to step 425 where the HVAC system is operated based on maximum and minimum unoccupied temperatures. While in the unoccupied state, the HVAC system operates to maintain a sensed temperature of the enclosed space between the maximum and the minimum temperatures. The method 400 then continues to step 440 and ends.

Figure 5:
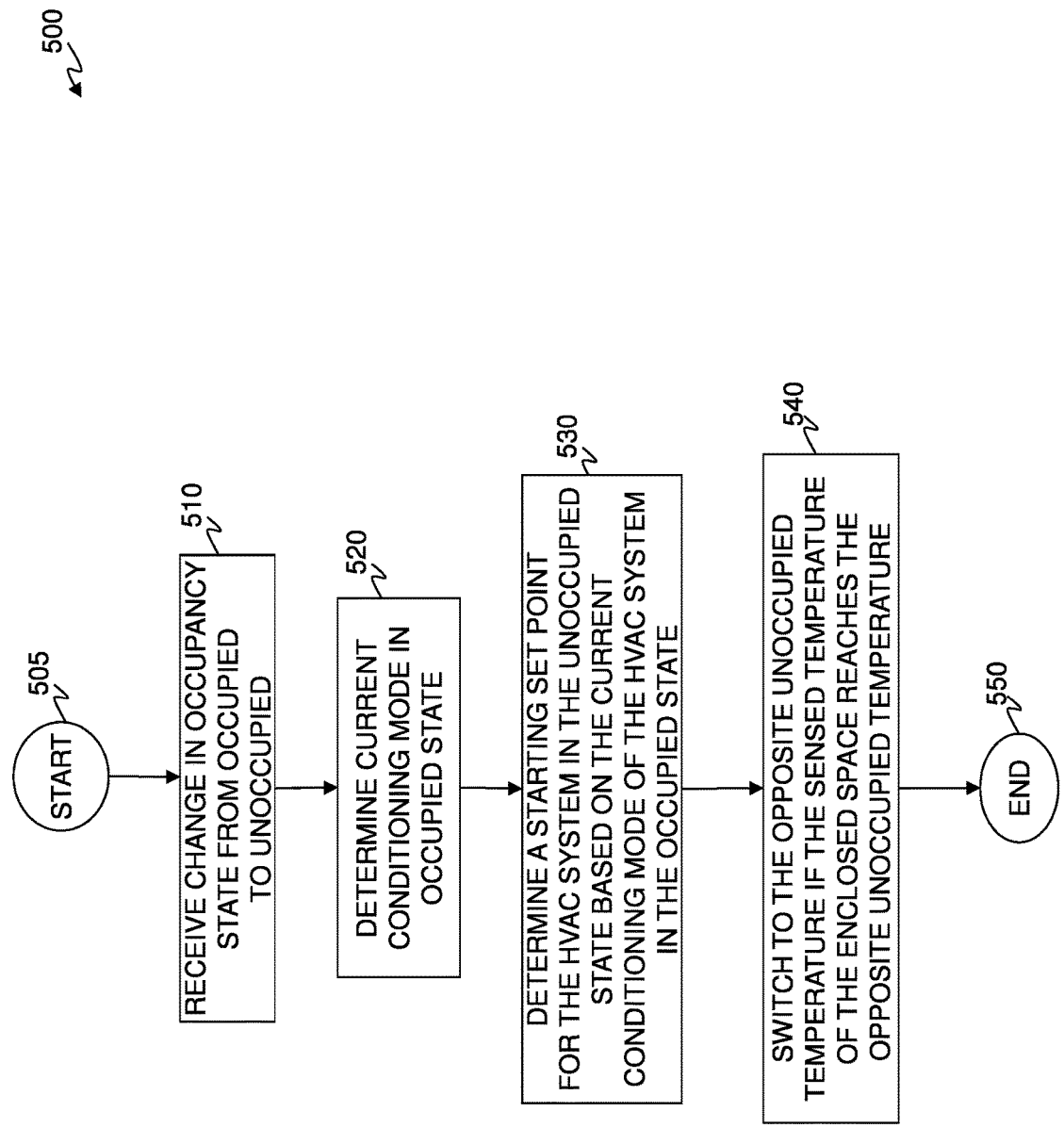
FIG. 5 is a flow diagram of another embodiment of a method of operating an HVAC system carried out according to the principles of the disclosure.

FIG. 5 is a flow diagram of an embodiment of a method 500 of operating an HVAC system carried out according to the principles of the disclosure. FIG. 5 is specifically directed to determining which of the two unoccupied temperatures to use when transitioning from an occupied state to an unoccupied state. The method 500 begins in a step 505 wherein the HVAC system is in an occupied state.

In a step 510, the HVAC system receives an occupancy input indicating a change in the occupancy state from occupied to unoccupied. The occupancy input is a data signal that indicates an occupied or unoccupied state. The occupancy input can be generated manually or automatically. For example, the occupancy input can be generated via the activation of an "away button" that a user manually selects via a user interface to place the HVAC system in an occupied state. Additionally, the occupancy input can be generated automatically via a program schedule of the HVAC system that indicates the user will not in the enclosed space during a certain time. The occupancy detection systems may be used to automatically generate the occupancy input to indicate the user is not present in the enclosed space.

In a step 520, the current conditioning mode of the HVAC system is determined. The conditioning mode can be, for example, a cooling mode or a heating mode. A flag can be used to indicate the particular conditioning mode.

In a step 530, a starting set point for the HVAC system in the unoccupied state is determined based on the current conditioning mode of the HVAC system in the occupied state. In one embodiment, the minimum unoccupied temperature is employed as a starting set point for the HVAC system if the current conditioning mode is determined to be heating mode. Additionally, if the current conditioning mode of the HVAC system is a cooling mode, the maximum unoccupied temperature is used as starting set point for the HVAC system.

In a step 540, the HVAC system switches to the opposite unoccupied temperature if the sensed temperature of the enclosed space reaches the opposite unoccupied temperature. For example, the HVAC system transitions to unoccupied state while operating in a heating mode. As such, the HVAC system operates in the heating mode and begins using the unoccupied minimum temperature for the heating set point. The temperature of the enclosed space then rises to the unoccupied maximum temperature. The HVAC system then switches from the heating mode to the cooling mode and begins to use the unoccupied maximum temperature as the cooling set point. The HVAC system continues to operate in between the maximum and minimum unoccupied temperatures while in the unoccupied state. The method 500 ends in a step 550. The method 500 can end when receiving an occupancy input indicating an occupied state. As such, the HVAC system transitions back to employing the comfort temperature.

Figure 6:
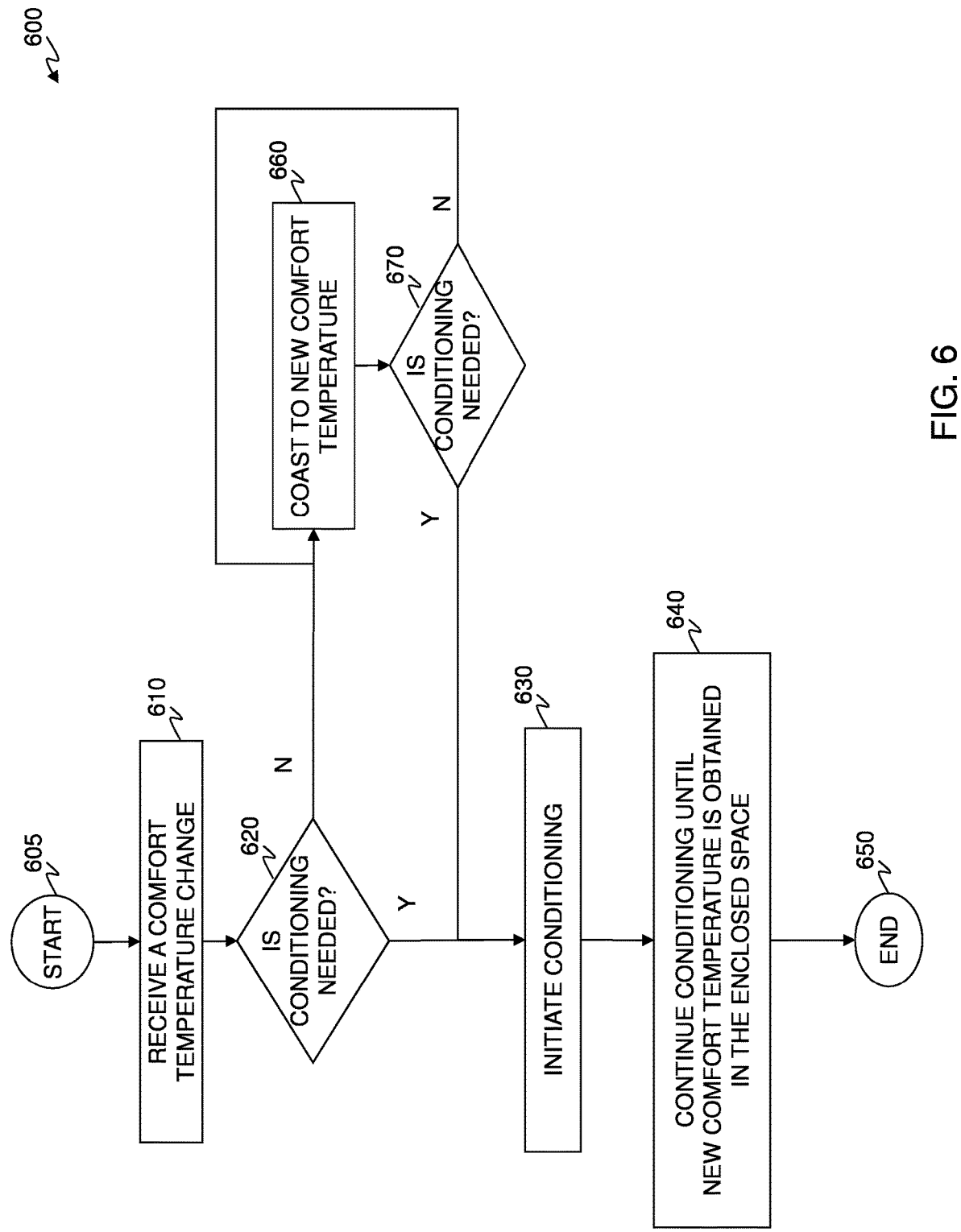
FIG. 6 is a flow diagram of yet another embodiment of a method of operating an HVAC system carried out according to the principles of the disclosure.

FIG. 6 is a flow diagram of an embodiment of a method 600 of operating an HVAC system carried out according to the principles of the disclosure. The method 600 is specifically directed to determining if the HVAC system can coast to the comfort temperature or if activation of a conditioning source is needed. When a change of the comfort temperature occurs, it may be desirable for the HVAC system to coast to the new comfort temperature rather than drive the conditioning equipment to reach the comfort temperature. In one embodiment, coasting is not enabled when transitioning from an unoccupied state to an occupied state. In some embodiments, the determination for an HVAC system to coast is made after updating the step change flag, but before calculating new PI errors. The method 600 begins in step 605 when the comfort temperature is changed. In some embodiments, the method 600 is executed every time the temperature sensor in the enclosed space is read.

In a step 610, the HVAC system receives a change of the comfort temperature. A comfort temperature input can be used to indicate the change. The comfort temperature input can be a data signal that indicates an increase or a decrease in the comfort temperature. The comfort temperature input can be generated manually via a user interacting with a user interface. For example, the comfort temperature input can be generated via the activation (e.g., touching or pressing) of up and down buttons on a user interface. The user interface can be part of the HVAC system, such as a thermostat, or can be a non-HVAC device, such as a smart phone, that interacts with the HVAC system. As such, a user can remotely alter the comfort temperature while approaching the enclosed space.

A determination is made in a first decisional step 620 if a conditioning mode is needed to obtain the new comfort temperature. In one embodiment, the determination is based on the total error value immediately prior to the comfort temperature change and the current coasting time. The total error value is compared to a threshold and the current coasting time is compared against a maximum allowed coasting time. If the total error value satisfies this condition and the current coasting time is less than the maximum coasting time, then the HVAC system does not initiate a conditioning source.

If a determination is made that conditioning is needed, then a conditioning mode of the HVAC system is initiated to obtain the new comfort temperature in a step 630. The method 600 then continues to step 640 where the HVAC system continues to condition the air for the enclosed space. The HVAC system can continue to condition according to the method 600. The method 600 then ends in a step 650.

Turning back to step 620, if a determination is made that conditioning is not needed, then the method 600 continues to step 660 wherein the HVAC system is allowed to coast to the new comfort temperature. In some embodiments, a coasting timer is also initiated to track the coasting time.

A determination is then made in a second decisional step 670 if conditioning is now needed to obtain the new comfort temperature. In one embodiment the decision is based on if the coasting timer has expired and a slope of a change of the sensed temperature over a set time. A change counter can also be employed to determine is conditioning is needed. If it is determined that conditioning is still not needed, the method 600 continues to step 660. If a determination is made that conditioning is needed, the method continues to step 630.

Accordingly, when a comfort temperature is changed a determination is made if conditioning is needed or if the HVAC system can coast, i.e., enter a coast mode. For example, when the comfort temperature is lowered and the total error value immediately prior to the comfort temperature change is greater than or equal to zero, indicating that the system was heating, the total error value is checked against a threshold and the current time coasting is checked against the maximum allowed coasting time. In one embodiment, the threshold used to check the total error value for cooling coasting is a selected constant minus the difference between the new comfort temperature and the old comfort temperature.

If the total error value satisfies this condition and the current coasting time is less than the maximum coasting time, then the HVAC system does not turn on cooling to meet the new comfort temperature. Instead, the HVAC system initiates a timer and lets the room temperature coast down to the new comfort temperature (i.e., a cool coast). If the coast timer reaches a predetermined threshold, and the determined slope of the sensed temperature is not less than or equal to a predetermined slope of degrees drop per hour, then the coast mode is cancelled and cooling can be initiated.

Instead of a coast timer, in some embodiments a change counter is employed as discussed above with respect to the change criteria. In one embodiment, the change counter is incremented or decremented according to a slope of the sensed temperature over time. The change counter can be incremented and decremented asymmetrically. While the change counter remains below a change threshold, the integral error is prevented from growing toward the opposite mode. Once the change counter crosses the change threshold, then the integral error is allowed to grow and the value of the change counter is not monitored. In some embodiments, the outdoor weather is also considered in the method 600 when determining if conditioning is needed.

The disclosure provides a controller for a HVAC system of an enclosed space that includes an interface configured to receive a comfort temperature for the enclosed space and a processor configured to operate the HVAC system in either a coasting mode or one of a plurality of conditioning modes based on the comfort temperature set point and a total error value. While in a coasting mode, the controller does not initiate a conditioning mode. The controller can also delay or prevent the initiation of a conditioning mode based on the outdoor weather of the installed location of the HVAC system. Thus, the controller can consider the outdoor temperature when determining if a conditioning mode is needed to reach a comfort temperature.

The total error value includes a proportional error added to an integral error as in a PI error. Unlike a PI error, however, the integral error of the total error value is controlled or manipulated as described herein. The processor of the controller or HVAC controller can modify an integral error of the total error value according to a change criteria when the HVAC system receives a change of the comfort temperature. The change criteria can be based on a value of a change counter that is incremented or decremented according to a slope of the sensed temperature over time. The processor can operate the HVAC system in either the coasting mode or one of the plurality of conditioning modes based on the comfort temperature set point, the total error value and an occupancy state associated with the HVAC system. In an unoccupied state, the processor can be configured to operate the HVAC system based on a maximum unoccupied temperature and a minimum unoccupied temperature. In The above-described methods or at least part thereof may be embodied in or performed by various conventional digital data processors, microprocessors or computing devices, wherein these devices are programmed or store executable programs of sequences of software instructions to perform one or more of the steps of the methods, e.g., steps of the method of FIGS. 3-6. The software instructions of such programs may be encoded in machine-executable form on conventional digital data storage media, e.g., magnetic or optical disks, random-access memory (RAM), magnetic hard disks, flash memories, and/or read-only memory (ROM), to enable various types of digital data processors or computing devices to perform one, multiple or all of the steps of one or more of the above-described methods, e.g., one or more of the steps of the method of FIG. 3. Additionally, an apparatus, such as dedicated HVAC controller, may be designed to include the necessary circuitry to perform at least some of the steps of the methods of FIGS. 3-6.

Portions of disclosed embodiments may relate to computer storage products with a non-transitory computer-readable medium that have program code thereon for performing various computer-implemented operations that embody a part of an apparatus, system or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as optical disks; and hardware devices that are specially configured to store and execute program code, such as ROM and RAM devices. Examples of program code include both machine code, such as produced by a compiler, and files containing higher level code that may be executed by the computer using an interpreter.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

The invention claimed is:

1. A controller for a heating, ventilating and air conditioning (HVAC) system, the controller comprising:
   an interface configured to:
      receive a comfort temperature set point for an enclosed space, the comfort temperature set point comprising a single set point used for both heating mode and cooling mode operation of the HVAC system; and
      receive a sensed temperature for the enclosed space; and
   a processor configured to:
      operate the HVAC system in a conditioning mode of operation, the conditioning mode of operation being one of: a heating mode and a cooling mode;
      after operating the HVAC system in the conditioning mode of operation, determine whether to operate the HVAC system in an opposite conditioning mode based on a comparison of a total error value to a pre-determined threshold, wherein:
         the opposite conditioning mode is the heating mode if the conditioning mode of operation is the cooling mode and the opposite conditioning mode is the cooling mode if the conditioning mode of operation is the heating mode;
         the total error value is calculated as a sum of a proportional error and an integral error;
         the proportional error is calculated based on a present value of a temperature error scaled according to a proportional gain value, the present value of the temperature error being calculated as a difference between the comfort temperature and the sensed temperature; and
         the integral error is determined based on a change counter, wherein the integral error is set to zero when the change counter is below a change threshold, wherein the change counter is incremented or decremented according to a slope of the sensed temperature of the enclosed space over time;

in response to determining that the total error value exceeds the pre-determined threshold, operate the HVAC system in the opposite conditioning mode; and in response to determining that the total error value does not exceed the pre-determined threshold, operate the HVAC system in a coasting mode.

2. The controller as recited in claim 1, wherein:
the integral error is calculated based on past values of temperature error scaled according to an integral gain value when the change counter exceeds the change threshold.

3. The controller as recited in claim 2, wherein the processor is configured to adjust one or both of the proportional gain value and the integral gain value in response to receiving a change of the comfort temperature set point.

4. The controller as recited in claim 1, wherein the processor is further configured to:
operate the HVAC system based on the comfort temperature set point when the enclosed space is determined to be in an occupied state; and
operate the HVAC system based on a maximum unoccupied temperature and a minimum unoccupied temperature when the enclosed space is determined to be in an unoccupied state.

5. The controller as recited in claim 1, wherein the processor is further configured to determine that the HVAC system has been in the coasting mode for a maximum coasting time.

6. The controller as recited in claim 5, wherein:
the processor initiates either the heating mode or the cooling mode in response to determining that the HVAC system has been in the coasting mode for the maximum coasting time.

7. The controller of claim 1, wherein the pre-determined threshold is the proportional gain value multiplied by a mode change temperature.

8. The controller of claim 1, wherein the change counter is incremented or decremented based on a comparison of the slope of the sensed temperature of the enclosed space over time to a slope threshold.

9. A method for controlling a heating, ventilating and air conditioning (HVAC) system, the method comprising:
receiving a comfort temperature set point for an enclosed space, the comfort temperature set point comprising a single set point used for both heating and cooling mode operation of the HVAC system;
receiving a sensed temperature for the enclosed space;
operating the HVAC system in a conditioning mode of operation, the conditioning mode of operation being one of: a heating mode and a cooling mode;
after operating the HVAC system in the conditioning mode of operation, determining whether to operate the HVAC system in an opposite conditioning mode based on a comparison of a total error value to a pre-determined threshold, wherein;
the opposite conditioning mode is the heating mode if the conditioning mode of operation is the cooling mode and the opposite conditioning mode is the cooling mode if the conditioning mode of operation is the heating mode;
the total error value is calculated as a sum of a proportional error and an integral error;

the proportional error is calculated based on a present value of a temperature error scaled according to a proportional gain value, the present value of the temperature error being calculated as a difference between the comfort temperature and the sensed temperature; and the integral error is determined based on a change counter, wherein the integral error is set to zero when the change counter is below a change threshold, wherein the change counter is incremented or decremented based on a comparison of a slope of the sensed temperature of the enclosed space over time to a slope threshold;

in response to determining that the total error value exceeds the pre-determined threshold, operate the HVAC system in the opposite conditioning mode; and in response to determining that the total error value does not exceed the pre-determined threshold, operate the HVAC system in a coasting mode.

10. The method of claim 9, wherein:
the integral error is calculated based on past values of temperature error scaled according to an integral gain value when the change counter exceeds the change threshold.

11. The method of claim 10, further comprising adjusting one or both of the proportional gain value and the integral gain value in response to receiving a change of the comfort temperature set point.

12. The method of claim 9, further comprising:
operating the HVAC system based on the comfort temperature set point when the enclosed space is determined to be in an occupied state; and
operating the HVAC system based on a maximum unoccupied temperature and a minimum unoccupied temperature when the enclosed space is determined to be in an unoccupied state.

13. The method of claim 9, further comprising:
determining that the HVAC system has been in the coasting mode for a maximum coasting time; and
initiating the heating mode or the cooling mode in response to determining that the HVAC system has been in the coasting mode for a maximum coasting time.

14. A heating, ventilating and air conditioning (HVAC) system operable to condition an enclosed space, the HVAC system comprising:
one or more heating components operable to heat to heat the enclosed space when the HVAC system is in a heating mode;
one or more cooling components operable to cool the enclosed space when the HVAC system is in a cooling mode;
one or more temperature sensors, the temperature sensors operable to sense temperature data associated with the enclosed space; and
a controller operable to:
receive a comfort temperature set point for the enclosed space, the comfort temperature set point comprising a single set point used for both the heating mode and the cooling mode operation of the HVAC system; and
receive a sensed temperature from the temperature sensors; and
operate the HVAC system in a conditioning mode of operation, the conditioning mode of operation being one of: a heating mode and a cooling mode;

after operating the HVAC system in the selected conditioning mode, determine whether to operate the HVAC system in an opposite conditioning mode based on a comparison of a total error value to a pre-determined threshold, wherein:
the opposite conditioning mode is the heating mode if the conditioning mode of operation is the cooling mode and the opposite conditioning mode is the cooling mode if the conditioning mode of operation is the heating mode;
the total error value is calculated as a sum of a proportional error and an integral error;
the proportional error is calculated based on a present value of a temperature error scaled according to a proportional gain value, the present value of the temperature error being calculated as a difference between the comfort temperature and the sensed temperature;
the integral error is determined based on a change counter, wherein the integral error is set to zero when the change counter is below a change threshold, wherein the change counter is incremented or decremented according to slope of the sensed temperature of the enclosed space over time;
in response to determining that the total error value exceeds the pre-determined threshold, operate the HVAC system in the opposite conditioning mode;
in response to determining that the total error value does not exceed the pre-determined threshold, operate the HVAC system in a coasting mode.

15. The HVAC system of claim 14, wherein:
the integral error is calculated based on past values of temperature error scaled according to an integral gain value when the change counter exceeds the change threshold.

16. The HVAC system of claim 15, wherein the controller is configured to adjust one or both of the proportional gain value and the integral gain value in response to receiving a change of the comfort temperature set point.

17. The HV AC system of claim 15, wherein the change counter is incremented or decremented based on a comparison of the slope of the sensed temperature of the enclosed space over time to a slope threshold.

* * * * *